Oct. 14, 1952     M. A. RICHARD     2,613,808

EGG CANDLER AND GRADER

Filed Sept. 26, 1949     2 SHEETS—SHEET 1

INVENTOR

MILLARD A. RICHARD

BY *Frank C. Maley*

AGENT

Oct. 14, 1952
M. A. RICHARD
2,613,808
EGG CANDLER AND GRADER
Filed Sept. 26, 1949
2 SHEETS—SHEET 2
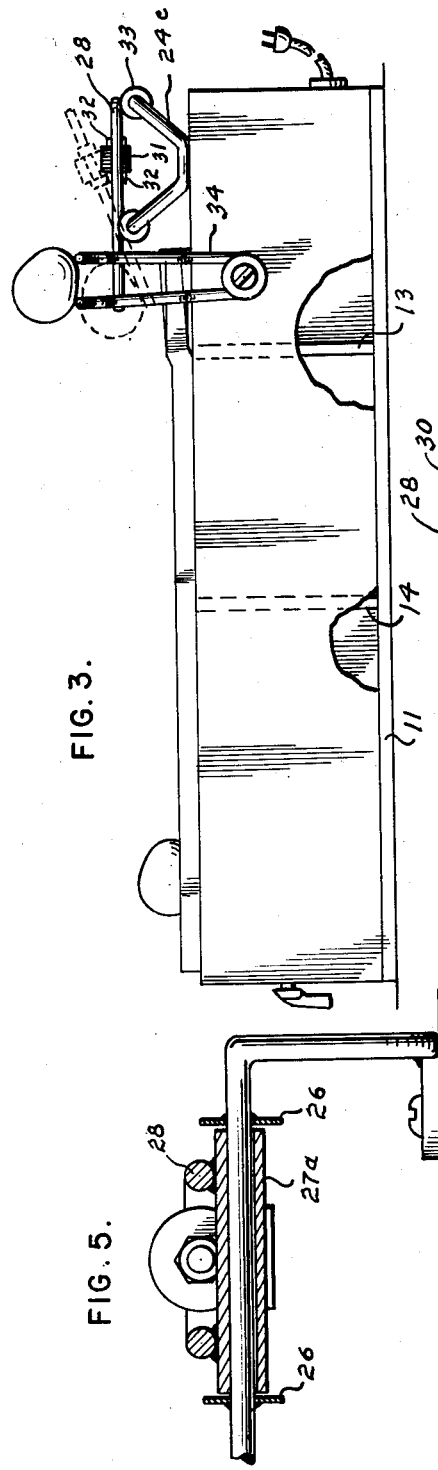
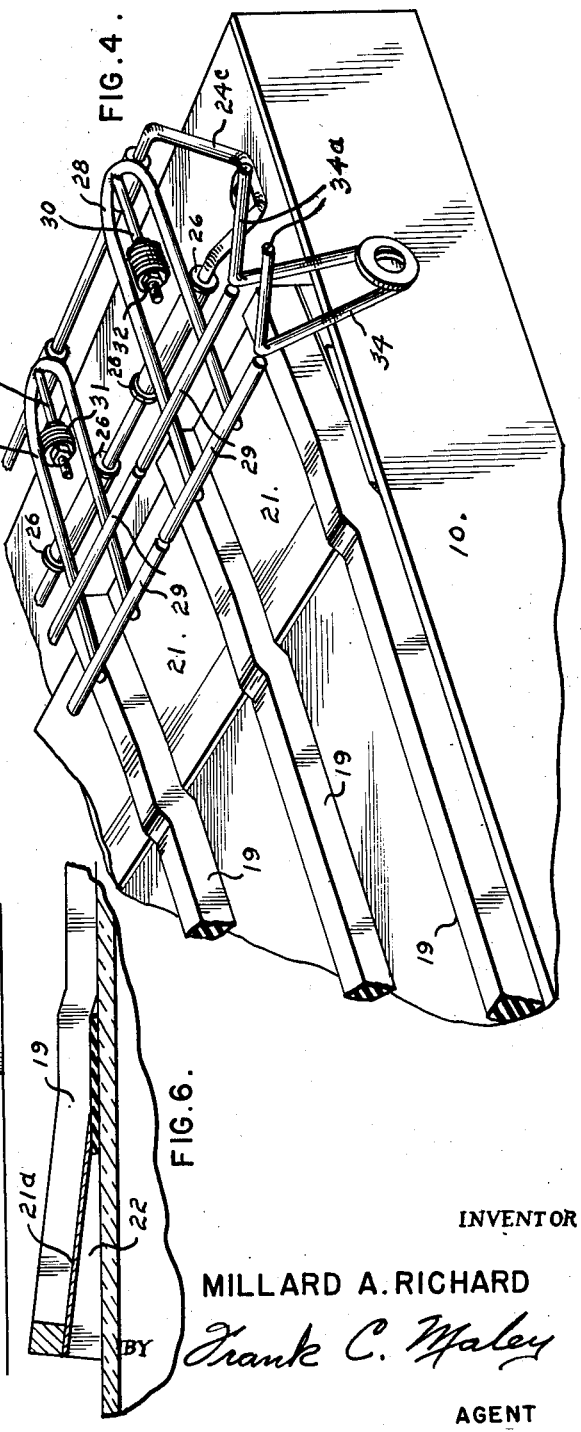
INVENTOR
MILLARD A. RICHARD
BY Frank C. Maley
AGENT Patented Oct. 14, 1952

2,613,808

UNITED STATES PATENT OFFICE 2,613,808

EGG CANDLER AND GRADER

Millard A. Richard, Lakeville, Ind.

Application September 26, 1949, Serial No. 117,900

1 Claim. (Cl. 209—71)

This invention relates to improvements in apparatus for grading and candling eggs, and is an apparatus particularly designed for the efficient performance of these services by those handling eggs in comparatively small quantities and wherein the eggs are being handled more or less as individuals. The apparatus is especially efficient, for instance, under conditions where the user is transferring eggs from the wholesale characteristics of an egg case to the retail conditions of egg cartons. In making the transfer, the eggs are subjected to a grading action with weight as the grading factor and then to a candling procedure in connection with the graded eggs.

Various forms of apparatus for grading and candling eggs are well known, both as to these services as individuals and to such services combined in a single apparatus, the present invention pertaining to the combined service type. Since the grading procedure necessarily involves the testing of the eggs individually as to weight, while the candling procedure involves the positioning of the egg between a light source and the eyes of the user, there is more or less similarity structurally and operationally between such different apparatuses so that the broad characteristics of such assemblies have much in common. However, the prior structures have generally been so formed and arranged in developing individual forms as to present disadvantageous features as well as advantageous ones, with the result that efficiency has not been completely obtained.

For instance, it has been contemplated in the combined service type to provide the candling prior to grading, thus possibly permitting the candling of several eggs at once. Such course permits the discarding of the bad eggs prior to grading, but inasmuch as the grading takes place afterward, there is no assurance that the grading procedure may not affect the egg condition, in which case the earlier candling is made useless, and the test valueless, since no candling tests are made subsequently. It has also been proposed to provide candling subsequent to grading, but the candling is generally then individual and generally associated with the grading structure operation, thus increasing the time required for completing the cycle or requiring the services of additional help, since the candled egg must be removed prior to the arrival of the succeeding egg; these structures generally operate as individuals, by using a plurality of assemblies each having its individual weight test so that selection as between assemblies must first be made by the user, or cause the need of shifting the egg from one assembly to another assembly after initially making an error in selection, thus further increasing the length of the cycle. The present invention candles the egg after grading within the cycle, but the candling is not associated with the grading structure operation and permits an accumulation of eggs of a grade within the candling station, thus giving the user a longer period for completing the candling without affecting the grading operation.

Generally the combined service assemblies are complicated in structure, thus rendering them somewhat costly. The presence assembly is simple, but highly efficient, and thus is of materially lower cost possibilities.

Other distinguishing characteristics are present between the present invention and the prior developments, and will be referred to hereinafter, the above comparisons being indicative of the nature of some of the advantageous values presented in the present invention over the combined service structures heretofore contemplated.

To these and other ends, therefore, the nature of which will be better understood as the invention is hereinafter disclosed, said invention consists in the improved constructions and combinations of parts, hereinafter described in the following specification, illustrated in the accompanying drawings, and more fully pointed out in the appended claim.

In the accompanying drawings, in which similar reference characters indicate similar parts in each of the views, Figure 1 is a face view, in plan, of an assembly in accordance with the present invention.

Fig. 3 is a side elevation of the assembly.

Fig. 4 is a fragmentary perspective view of a portion of the assembly.

Fig. 5 is a detail sectional view taken on line 5—5 of Fig. 1.

Fig. 6 is a fragmentary sectional view on line 6—6 of Fig. 1.

Figure 1:
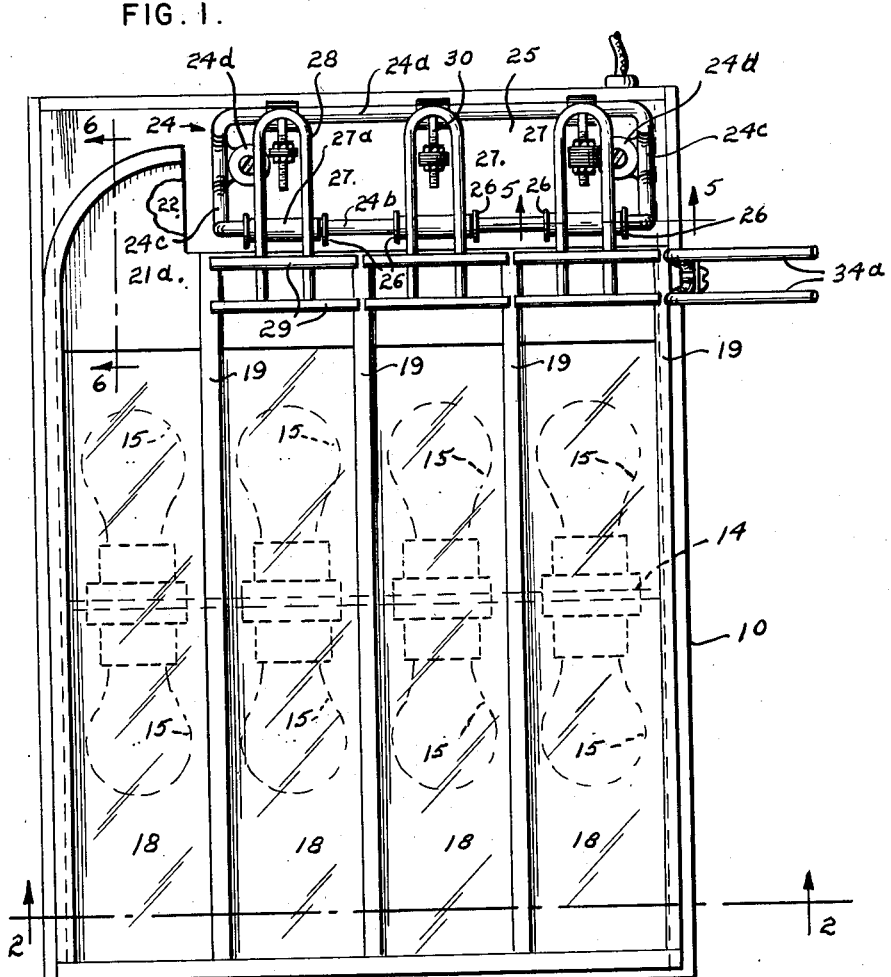
Figure 2:
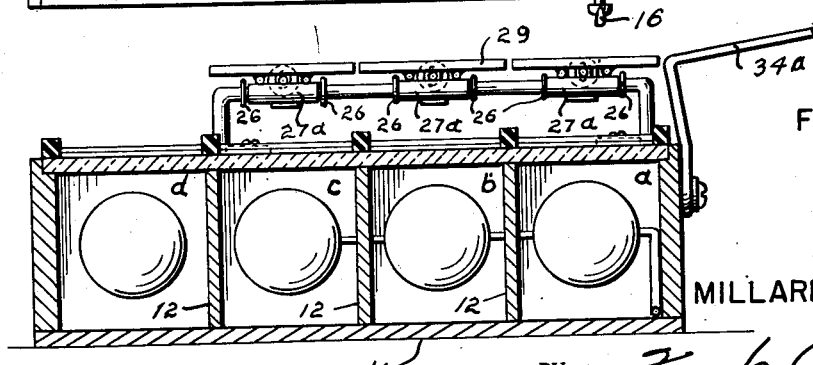
Fig. 2 is a sectional view taken on line 2—2 of Fig. 1.

The base member of the assemblage is in the form of an elongated casing 10 having a bottom, sides and end walls, the casing being designed to lie approximately level, but preferably with its upper end or head zone raised a small distance in service to thereby produce a slight tilt effect; the bottom 11 presents the larger area of the walls, with the sides and ends extending vertically therefrom and approximately of similar vertical height. The major portion of the length of the casing is designed to form a housing for lighting means used in candling, for which purpose the casing is provided with a plurality of spaced partitions 12, extending parallel with the sides of the casing and serving to divide the interior of the casing into a plurality of compartments, shown at a, b, c and d, as four in number, the upper end of the compartments being closed by an end partition 13, with the compartment length divided by the presence of cross-partitions 14, thus forming upper and lower zones in each of the compartments.

The cross-partitions 14 are designed to carry lamp sockets for electric light bulbs, each partition 14 carrying a pair of sockets opening respectively into the upper and lower zones of a compartment, to permit of the location of a light bulb 15 in each of the zones of the compartment. Suitable wiring connections to the several bulbs and sockets from a switch 16 together with a suitable plug connection 17, permits of ready connection with a house or other lighting circuit, and permits the bulbs to be rendered active at will. As will be understood, the opposite mounting of the bulbs of a compartment serve to actually present individual illuminating areas in the two zones located in the direction of length of a compartment.

The top of the compartment portion of the casing is closed by a glass sheet 18, the top zones of the side walls and of the lower end wall being rabbeted to receive it, while such zones are omitted from the upper end wall of the compartments and partitions 12 and cross-partitions 13, the latter underlying the glass sheet. The top surface of the glass sheet is provided with a plurality of longitudinally extending parallel strips 19, preferably formed of soft rubber, these being positioned in vertical alinement with the partitions 12 and are designed to form open-top channels individual to the compartments, with the glass sheet forming the bottom for each channel. As presently described, these channels receive the eggs of the different grades, the eggs moving downward over the glass channel bottom, thus permitting ready candling of the eggs as they move toward the lower end of the casing; the outer strips 19 preferably lie inside of the rabbeted zones of the side walls, while a similar cross-strip 20, also of rubber, lies inside the rabbeted zone of the lower end wall to form a barrier against the escape of the moving eggs at such lower end.

If desired, individual glass sheets for each compartment may be employed instead of a single sheet, in which case partitions 12 would include rabbeted zones, and the strips 19 would overlie the upper faces of such partition zones.

The glass sheet or sheets 18 extend a short distance above the upper cross-partitions and thus into the path of an egg transferred from the runway by the tilting of a grading unit in connection with compartments a, b and c, the head end zone of the upper face of the glass being covered by a rubber matting 21 overlying the compartments, the matting extending a short distance below the cross-partition position. The glass over compartment d is similarly equipped, but the upper zone of this compartment differs somewhat from those of the remaining compartments in that it is not equipped with a grading unit, this compartment being adapted to receive the ungraded eggs, these being received direct from the runway.

In connection with compartment d, the outer strip 19 is of increased length, as at 19a, this portion being curved inwardly toward the adjacent grading unit and is gradually raised, as by the presence of a wedge-shaped member 22 overlying this zone of the compartment with its lower end zone carried by the end zone of the glass and having its upper face covered with matting 21a, the lower end zone of which overlies the matting 21 of the glass, the other side edge of member 22 being curved to accord with the curvature of strip portion 19a which is carried by member 22. The assembly thus forms an entrance zone to the end channel overlying compartment d with the entrance presenting a face slightly below the runway end and on to which the eggs may pass without danger of becoming broken, since the bottom of the continuation of the channel carries the rubber matting protection and the distance of fall is comparatively small. Compartment d is also equipped with the light bulbs 15 so that the eggs of this channel are also candled.

The grading units, indicated generally at 27, are mounted on a frame 24 supported on the bottom of the casing above the candling section just described. The frame is of skeleton type with a pair of parallel bars 24a and 24b joined at their ends by members 24c, each of approximately V-shape with the apex zone in the form of eyes 24d by means of which the frame is secured to the upper face of a plate 25 which forms a continuation of the glass zone 18, the end formations serving to raise the frame sides 24a and 24b a material distance above the top plane of the glass zone and its strips 19, such frame sides having a length to extend over the combined width of compartments a, b and c, the frame being preferably formed of wire of a heavy gauge.

The lower side member 24b is provided with a succession of pairs of stop members 26, each pair being spaced apart and positioned symmetrically to the width of the channel of such compartments a, b and c, the stop members serving to position the bearing sleeves 27a of the respective grading units 27, a sleeve being mounted on side 24b between the members of a pair, thus positioning the grading units, the sleeves 27a permitting individual arcuate swing of the units with the sleeve forming the pivot for such swing.

The unit 27 otherwise comprises an inverted U-shaped wire member 28 welded or otherwise secured to the top face of a sleeve 27a with the latter near the middle of the length of the legs of member 28, the leg connection portion overlying the upper side member 24a. The lower zone of the member legs is provided with a pair of parallel spaced wire bars 29 extending at right angles to the direction of length of the legs, and welded or otherwise secured to the upper side of such legs, the bars having a length slightly greater than the width of a compartment so that the bars of the several units form practically a continuous runway for eggs, the bars of one unit being separated from those of an adjacent unit a distance only sufficient to permit free swinging of the unit.

The cross-connection of member 28 carries a threaded rod 30, welded or otherwise secured to the mid-zone of the connection, and extending parallel with the legs of the member and in the plane of such legs, the rod being of a length sufficient to receive a plurality of flat circular weight members 31 between a pair of securing nuts 32. In the working position of the assemblage the weight members 31 serve to retain the units in position to produce the substantially continuous run-way, with the cross-connection end of the member 27 resting upon side 24a, or preferably upon a rubber covering sleeve 33 carried by such side in position to support such end of the member.

In practice, the several units will carry a different number of weight members 31. In Fig. 1 for instance, the unit of compartment a is shown equipped with four of such members, the unit for compartment b having three of the members, while the unit for compartment c employs two of the members. These values are illustrative only, except as to the direction of decrease of weight in the several units, the progression of decrease being from a to c. In other words, the normal position of the unit of compartment a would be disturbed only in presence on its runway section of an egg the weight of which exceeds that of the weight factor sufficient to cause the runway of the unit to swing on its pivot. If the egg weight is insufficient to so disturb the position of the unit, the egg continues to advance on to the succeeding unit in which the weight value to be overcome is less and if still unable to disturb this unit, the egg passes on to the third section of the runway, which presents a still lower weight factor. If the egg is still unable to operate the latter unit, it passes off of the latter runway into the entrance to the fourth compartment which receives the residue.

As will be understood, the number of compartments and channels shown and described are illustrative only, the four shown being sufficient to provide for the grading ranges in general usage. By adding one or more additional compartments with their grading units, the grading range may obviously be increased, or the grade limits be reduced.

For the purpose of providing impetus to the egg sufficient to travel the full length of the runway if necessary, an entrance zone for the runway is preferably provided. This is shown in the drawings as a wire member 34 secured to the side of the casing and properly bent to provide a pair of spaced arms 34a which extend outwardly and in alinement with the runway rods, these arms being inclined upwardly from a point adjacent the entrance end of the first unit when the latter is in its repose position. When an egg is placed on the free end of the arms of the member and permitted to roll, it acquires sufficient impetus to carry it to the end of the runway and lightly fall into the entrance to compartment d, but the impetus is not such as would cause the egg to traverse a unit runway at a speed such as would prevent the beginning of the swinging action of the unit if the egg weight were sufficient to overcome the weight factor provided by the weight members of the unit. As soon as the unit runway begins to swing downward, the travel continuity over the runway is disturbed and the egg will contact the adjacent ends of the runway of the next unit thus stopping the egg advance but still retain the egg weight as a factor in swinging the unit.

The swinging of the unit will generally be at a somewhat gentle rate, since it is only the excess weight of the egg which is producing the movement of the unit. As the excess weight is generally small in value, the swinging movement will be gentle, so that as the unit runway lowers to bring it adjacent to the bottom of the compartment channel, the inclination of the legs of member 27 so changes the relative heights of the opposite bars of the runway as to permit the egg to slide off the runway in proximity to the rubber matting at the head of the channel, and thus be deposited gently and without material liability of damaging the shell of the egg. The latter then moves downward in the channel toward the lower end of the latter. During its downward travel or when it has come to a position of repose, the egg is in position for candling inspection, and the rejected egg or eggs can be readily removed. The channel permits eggs to collect thereon, an advantage when placing them in cartons, since a carton can be quickly filled from a collection of eggs from the grade selected by the operation of the assemblage. The egg handling is thus practically limited to the positioning of the egg on the entrance ramp, and its removal from the channel, either as a reject or as a member of the carton content. In other words, the assemblage is capable of usage under maximum output conditions by the use of but two operatives, one of these being located at the supply station 34a to take the eggs from the usual packing case and position them successively on the runway at 34a, the other operative being at the disposal station at the foot of the assemblage, and thus in position to inspect the eggs of a channel at any time for candling, and to package them. The accumulating of the graded eggs permits a single operative to attend to all of the channels for both services, due to the fact that the candling can be under collective conditions, individual candling being unnecessary. Hence, by delaying the candling until after grading, instead of candling before grading, it becomes possible to dispense with the operative heretofore required at the candling station, since it is possible for the operative at the disposal station to efficiently conduct both candling and disposal services at the disposal station.

Where the entire service is performed by a single operative, the abitily to candle the eggs collectively after grading, as practiced herein, provides a material saving in time. The operative, when at the supply station feeding the eggs to the grading assembly, has all of the channels of the disposal station within his vision, and is thus able to note when the accumulations of a channel approach the limit, and can proceed to the disposal station, candle the eggs of the laden channel or channels and dispose of them to prepare the channel or channels for the continuation of grading through his return to the supply station, the rapidity of the candling reducing the time during which he is absent from the supply station.

From the above it will be understood that the assemblage provides a number of definite advantages. For instance, from the time the egg is placed on the entrance to the runway until it comes to rest in its appropriate channel, no manual action is required. If desired, the egg could be inspected while moving over the runway and could be bodily removed before reaching its position of repose, but such action is not compulsory, since inspection is possible when the egg is in position of repose and the eggs of a channel can thus be candled individually or collectively.

Another advantage is in the fact that the eggs of a grade can be permitted to accumulate, then candled with the removal of undesired eggs, and then the residue readily packaged into its cartons, thus materially reducing the time required for the test. A single operator can thus handle the entire grading and candling operations and complete the transfer of eggs from the crate to the cartons and during a shorter period.

The grading assembly is of simple formation and comparatively inexpensive. It is very efficient in operation, acting to deliver the eggs into the appropriate channels with no danger of breakage.

The candling after the grading takes place assures that the egg in its repose position is not broken or cracked, and after passing the candling test, is of a "select" grade, since no further manipulation is required other than the manual packaging into cartons, all activities incident to grading having been completed so that any border line eggs, unable to withstand the grading without becoming unacceptable, will be found and removed during the candling inspection.

While I have herein shown and described a preferred form of the invention, it is apparent that changes and/or modifications therein may be found essential or desirable in meeting the exigencies of service or the individual desires of a particular user, and I, therefore, reserve the right to make any and all such changes or modifications so found essential or desirable, insofar as the same may fall within the spirit and scope of the invention as expressed in the accompanying claim, when broadly construed.

What is claimed as new is:

An egg weighing and candling assemblage comprising means to feed eggs along a path, a series of weighers located along the path, each weigher being adjusted to discharge an egg of selected weight transversely of the path, a candling means to receive the discharged eggs and arranged to maintain each grade separated from the others, the said candling means comprising a series of glass-bottom parallel channels, one for each grade of eggs, a compartment underlying each channel and a lamp positioned in each compartment.

MILLARD A. RICHARD.

REFERENCES CITED

The following references are of record in the file of this patent:

UNITED STATES PATENTS

| Number | Name | Date |
| --- | --- | --- |
| 1,322,755 | Brander | Nov. 25, 1919 |
| 1,328,091 | Maheffey | Jan. 13, 1920 |
| 1,875,811 | Hilgers | Sept. 6, 1932 |
| 2,093,338 | Niederer | Sept. 14, 1937 |
| 2,112,324 | Arbron | Mar. 29, 1938 |
| 2,175,262 | Haugh | Oct. 10, 1939 |

FOREIGN PATENTS

| Number | Country | Date |
| --- | --- | --- |
| 309,689 | Great Britain | Apr. 18, 1929 |
| 312,484 | Great Britain | May 30, 1929 |